United States Patent [19]
Furusawa et al.

[11] 3,766,839
[45] Oct. 23, 1973

[54] SHUTTER OPERATING MECHANISM

[75] Inventors: Motoyoshi Furusawa; Seiji Asano, both of Ohmiya, Japan

[73] Assignee: Fuji Shashin Kobi Kabushiki Kaisha, Saitama-ken, Japan

[22] Filed: Oct. 6, 1970

[21] Appl. No.: 78,403

[30] Foreign Application Priority Data
Oct. 15, 1969 Japan.............................. 44/98140

[52] U.S. Cl........................... 95/42, 95/64 B, 95/57
[51] Int. Cl. ........................................... G03b 27/52
[58] Field of Search .................... 95/64 B, 64 C, 57, 95/42

[56] References Cited
UNITED STATES PATENTS

| 3,081,680 | 3/1963 | Goshima | 95/64 B X |
|---|---|---|---|
| 3,581,633 | 6/1971 | Uno | 95/42 X |
| 3,450,017 | 6/1969 | Noack | 95/64 B X |
| 3,498,195 | 3/1970 | Ono | 95/57 X |
| 3,304,848 | 2/1967 | Steisslinger | 95/42 |
| 3,580,154 | 5/1971 | Ettischer | 95/42 |
| 3,581,642 | 6/1971 | Nomura | 95/42 |

*Primary Examiner*—Samuel S. Matthews
*Assistant Examiner*—M. D. Harris
*Attorney*—Fleit, Gipple & Jacobson

[57] ABSTRACT

A single lens reflex camera having a shutter timing circuit and a trigger switch therein which operates in response to the operation of a member for actuating a reflex mirror positioned within the light path.

5 Claims, 7 Drawing Figures

Motoyoshi Furusawa
Seiji Asano
INVENTORS

SHUTTER OPERATING MECHANISM

BACKGROUND OF THE INVENTION

1. Field of the Invention

This invention relates to a shutter operating mechanism to be used in a single lens reflex camera which is so constructed that the light passing through an objective lens is reflected on a mirror to proceed towards a finder and the mirror is moved off the light path from the lens prior to the shutter operation, whereby the light is directed towards the surface of a film. More specifically, the invention relates to a shutter operating mechanism of the type described above which is provided with electrical timing means.

2. Description of the Prior Art

The shutter speed of an electrical shutter as described above is determined from the start of a first curtain to the start of a second curtain. In the past, an arrangement has been made such that a trigger switch in a shutter control circuit is operated at the start of the first curtain to charge a capacitor and a switching circuit is operated to release the attraction of an electromagnet, whereby the second curtain is started by the motion of a second curtain latching lever which has previously been attracted by the electromagnet. In this method, however, the start of the second curtain is delayed due to an operational delay of a second curtain operating mechanism including the electromagnet, and such delay is added to the aforesaid shutter speed. The effect of such delay is particularly remarkable at a high shutter speed and only a very inaccurate shutter speed can be obtained. This may be avoided simply by operating the trigger switch a predetermined time in advance of the start of the first curtain so as to compensate the operational delay of the second curtain operating mechanism. In this case, since the first curtain is started immediately after the mirror rising movement, the trigger switch is operated during the mirror rising movement. However, in order to accurately adjust the shutter speed in a high speed operation of the shutter, it is necessary to correctly set the time from the actuation of the trigger switch to the start of the first curtain, i.e., the time corresponding to the operational delay of the second curtain operating mechanism. In the ordinary single lens reflex camera, however, since the operation of automatic diaphragm control means and the mirror rising movement are lapped over each other timewise and the operation times of these elements are not constant, the start of operation of the trigger switch is also not constant and the shutter time can vary. This is because the operating time and force of the automatic diaphragm control means, which is operated by a member moved at the time of shutter release, are variable depending upon a set value of the diaphragm control means. The trigger switch is so arranged as to be operated during the mirror rising movement, so that even a several millisecond variation in the mirror rising movement results in a variation in the starting time of the trigger switch operation.

SUMMARY OF THE INVENTION

The principal object of the present invention is to eliminate the above-described disadvantage by operating the trigger switch in the shutter timing circuit in response to the operation of a member by which the mirror is moved off the light path.

According to the present invention there is provided a shutter operating mechanism in a single lens reflex camera of the type comprising a shutter release member, automatic diaphragm control means which is normally held in a full-open position but is closed to a predetermined aperture value in response to the operation of the shutter release member, a mirror which is normally held in a position to reflect the light from an objective lens towards a finder but is moved off the light path through the objective lens in response to the operation of the shutter release member, a member to operate a first curtain of a shutter in response to the operation of the shutter release member and a member to operate a second curtain of the shutter; which shutter operating mechanism comprises a timing circuit which includes a trigger switch to be operated in response to the movement of the mirror and by which the operation of the second curtain operating member is controlled.

It is preferable to arrange such that the mirror and the shutter first curtain operating member are concurrently operated by a single pivot lever, and in this case the trigger switch of the timing circuit is operated by the lever.

According to a preferred embodiment of the invention two sliding plates are provided which are biased towards each other by a spring and which are arranged such that in winding the shutter the first sliding plate is moved in one direction by a predetermined distance, with the second sliding member being latched. In releasing the shutter the second sliding plate is released and moved in the one direction under the biasing force of the spring, whereby an automatic diaphragm control means is operated to a predetermined aperture value in response to the movement of the second sliding plate and concurrently the lever is moved.

It is also preferable that a pivotable second lever is provided coaxially with the first lever and a spring is extended between the two levers. The second lever is rotated by the movement of the second sliding plate and the first lever is held against rotation in the initial stage of rotation of the second lever but is released when energy has been accumulated in the spring and is rotated by the accumulated energy of the spring.

It is also preferable that the second curtain operating member is latched by a spring-biased hook member and the hook member is disengaged from the second curtain operating member by the movement of an armature of an electromagnet which is deenergized at the end of the shutter time.

Figure 1:
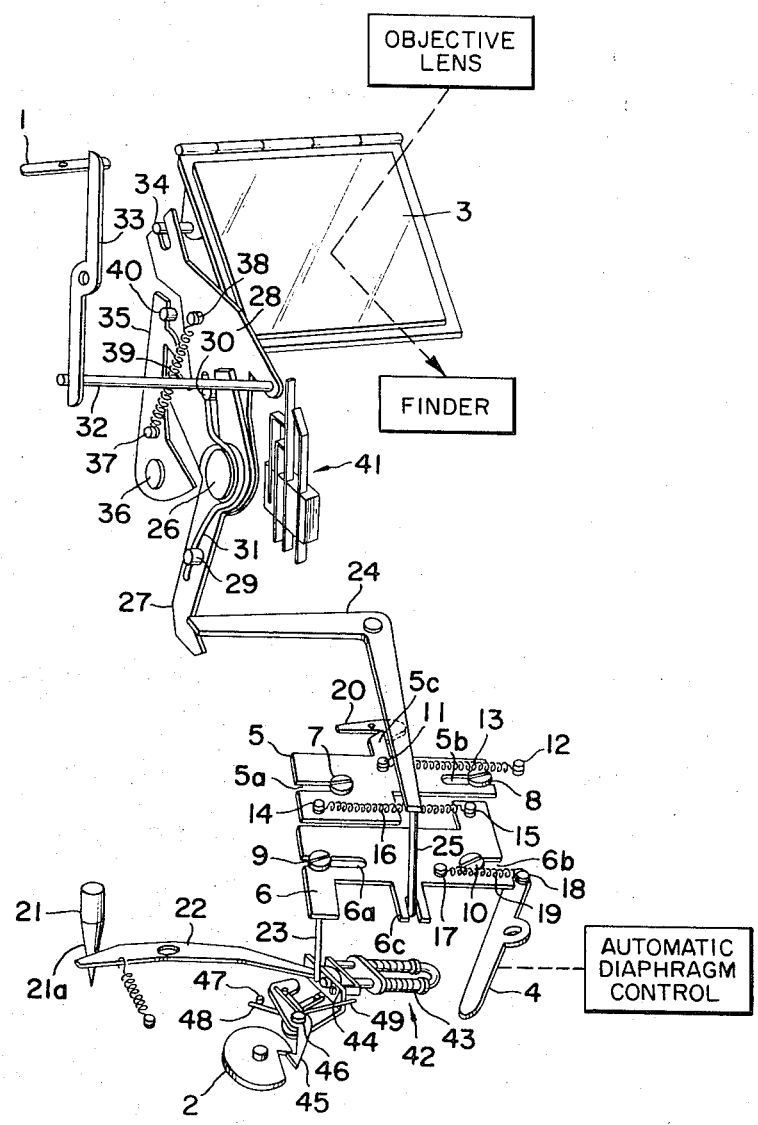
FIG. 1 is a perspective view, partly in diagrammatic form, briefly showing an embodiment of the shutter operating mechanism according to the present invention.

DESCRIPTION OF THE PREFERRED EMBODIMENT:

FIG. 1 shows a camera shutter operating mechanism in which the present invention is embodied, and the camera shutter (not shown) may be a conventional focal plane-type shutter comprising a first curtain operated by a shutter release button and a second curtain operated a predetermined time later. A member to operate the first curtain is indicated by numeral 1 and a member to operate the second curtain by numeral 2. The camera further comprises mirror means 3 which reflects the light passing through a lens (not shown) towards a finder and is moved in a direction to deviate from the light path at the time of shutter operation. Automatic diaphragm control means of the type known in the art are also provided. In FIG. 1, a member to operate the automatic diaphragm control means is indicated by numeral 4.

The shutter operating mechanism includes two sliding plates 5, 6. The sliding member 5 is provided with a pair of slots 5a, 5b at the opposite end portions thereof and slidable in the longitudinal direction with pins 7, 8 being in engagement with, slots 5a, 5b, respectively. Similarly, the sliding plate 6 is provided with a pair of slots 6a, 6b and slidable in the longitudinal direction with pins 9, 10 being in engagement with slots 6a, 6b, respectively. Sliding plate 5 is biased to the right as viewed in FIGS. 1 and 2, by a spring 13 extending between a pin 11, provided on the sliding plate, and a pin 12 provided on the camera body. Further, both sliding plates 5, 6 are urged towards each other by a spring 16 extending between pins 14, 15. The second sliding plate 6 is connected to the automatic diaphragm control means operating member 4 by a spring 19 extending between a pin 17, provided on the second sliding plate 6, and a pin 18 provided at one end of lever 4. At one edge of first sliding plate 5 is formed a projection 5c which engages a hook member 20 thereby to hold plate 5 in position.

Figure 2:
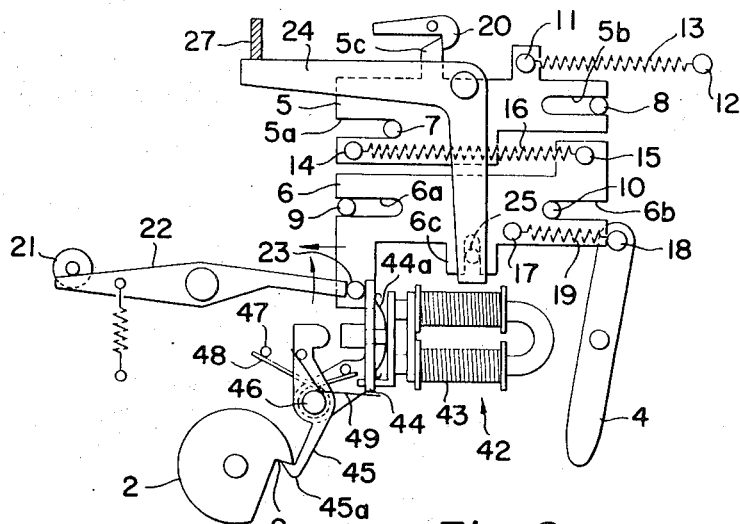
FIG. 2 is a plan view of a portion of the mechanism shown at the lower portion of FIG. 1.

A shutter release member 21, connected to a shutter release button (not shown), has a conical lower end 21a which engages a release lever 22 to rotate the same. The second sliding plate 6 is also provided with a pin 23 and the lever 22 is normally held in engagement with pin 23 as shown in FIG. 2, preventing the plate from moving to the left, as viewed in FIGS. 1 and 2. However, when member 21 is pushed down, lever 22 is rotated in a counterclockwise direction, as viewed in FIG. 2, and its end is disengaged from pin 23, permitting the second sliding plate 6 to move to the left.

At one edge of second sliding plate 6 is formed a bifurcated projection 6c and a pin 25 provided at one end of an L-shaped rocking lever 24 is received in the slot of the bifurcated projection 6c.

Figure 3:
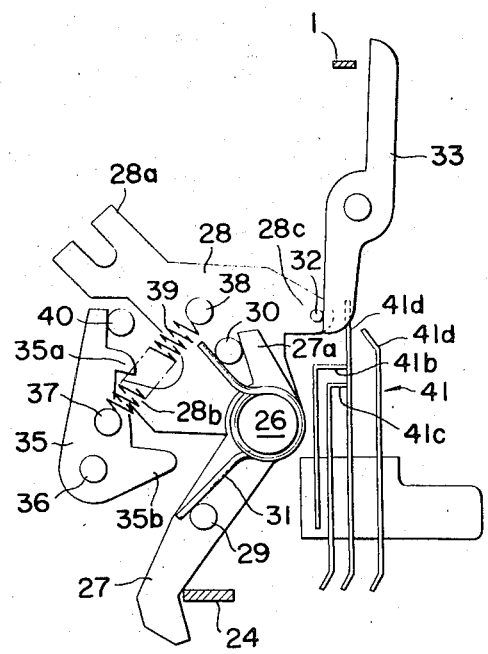
FIG. 3 is a side elevation showing a mechanism to operate a mirror and a first curtain operating member.

A mechanism to operate the first curtain of the shutter and the mirror includes a pair of levers 27, 28 rotatably mounted on a common shaft 26. A torsion spring 31 is provided acting between pins 29, 30 provided on the levers 27, 28, respectively, whereby levers 27, 28 are held in such positions that one end 27a of the lever 27 abuts against pin 30 (FIG. 3). The other end of lever 27 is in engagement with the end of L-shaped lever 24 opposite to the pin 25, so that lever 27 may be operated by lever 24. The lever 28 is provided with a pin 32 and the free end of pin 32 is in engagement with one end of a pivot lever 33, the other end of which is in engagement with the first curtain operating member 1. Thus, it will be understood that when lever 28 rotates in a clockwise direction, as viewed in FIG. 3, the first curtain operating member 1 is moved to operate the first curtain of the shutter. The lever 28 has a bifurcated portion 28a and a pin 34 on mirror 3 is in engagement with the bifurcated portion. Thus, mirror 3 is raised incident to rotation of lever 28.

As shown in FIG. 3, lever 28 is formed with a projection 28b, and a hook member 35, having a hook portion 35a for engagement with projection 28b, is pivotally mounted on a pin 36 in adjacent relation to lever 28. The hook member 35 is rotated clockwise by a spring 39, extending between a pin 37 on the hook member and a pin 38 on the lever 28, until it abuts against a stop pin 40 and is normally held in an operative position. Therefore, when lever 27 is rotated by lever 24 about shaft 26 in a clockwise direction, as viewed in FIG. 3 at the time of releasing the shutter, lever 28 is held against rotation by hook member 35, so that a relative rotation occurs between levers 27, 28 and energy is accumulated in spring 31. As lever 27 is further rotated in a clockwise direction, it abuts against a projecting leg 35b of hook member 35, causing the hook member to rotate in a counterclockwise direction, as viewed in FIG. 3, whereby the engagement between the lever 28 and the hook member 35 is released. As a result, lever 28 is rotated in a clockwise direction, as viewed in FIG. 3, by the energy accumulated in spring 31 in the initial stage of rotation of lever 27, and thereby the first curtain operating member 1 and the mirror 3 are operated.

A switch 41 is provided adjacent that end 28c of lever 28 where pin 32 is provided. When lever 28 is rotated in a direction to operate the first curtain operating member 1 and the mirror 3, as described above, the end 28c thereof operates a switch arm 41a to disengage it from contacts 41b, 41c and to bring it into contact with a contact 41d.

Electromagnet means 42 are provided adjacent the free end of pin 23 provided on the second sliding plate 6 of the shutter operating mechanism. The electromagnet means 42 comprises an electromagnet 43 and an armature 44 co-operating with the electromagnet. The armature 44 is rotatably mounted on a shaft 46 coaxially with a hook lever 45 and is urged in a direction to move away from the electromagnet 43 by a strong spring 48 acting between it and a fixed pin 47. Hook lever 45 has a hook portion 45a adapted to engage a notch 2a formed in the second curtain operating member 2, and is urged in a clockwise direction, as viewed in FIG. 2 by a weak spring 49 acting between it and the armature 44. Therefore, the second curtain operating member 2 is urged to be normally latched by hook lever 45 but, when the armature is pushed to the left, as viewed in FIG. 2, by the action of the spring 48, the hook 45a is released from engagement with the second curtain operating member 2 as the action of the strong spring 48 overcomes the action of the weak spring 49. Thus, the operation of the second curtain (not shown) is commenced. As clearly shown in FIG. 2, when pin 23 on the second sliding plate 6 is in engagement with the end of lever 22, it also engages the armature 44, holding the armature in a position attracted to the electromagnet 43. When the shutter release member 21 is depressed under such condition, the electromagnet 43 is energized at first, to attract the armature 44 and to hold it in the attracted position, and then the lever 22 is moved, with its end being disengaged from pin 23.

Figure 4:
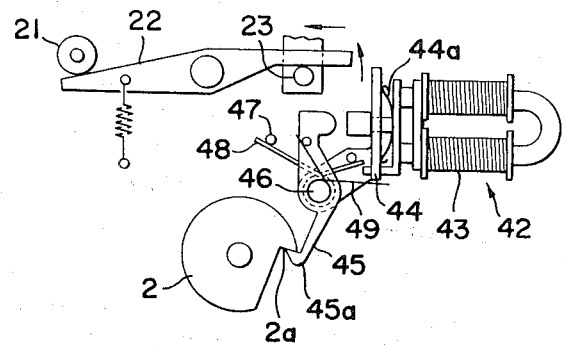
FIGS. 4 and 5 are fragmentary plan views illustrating the operation of a second curtain operating member.
Figure 6:
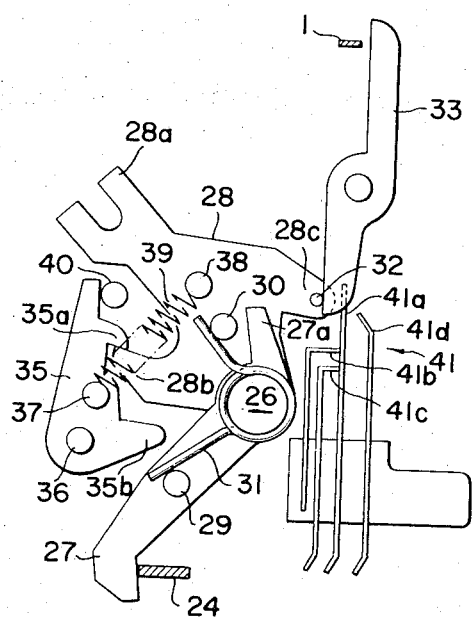
FIGS. 6 and 7 are views illustrating the operation of the portion shown in FIG. 3.
Figure 7:
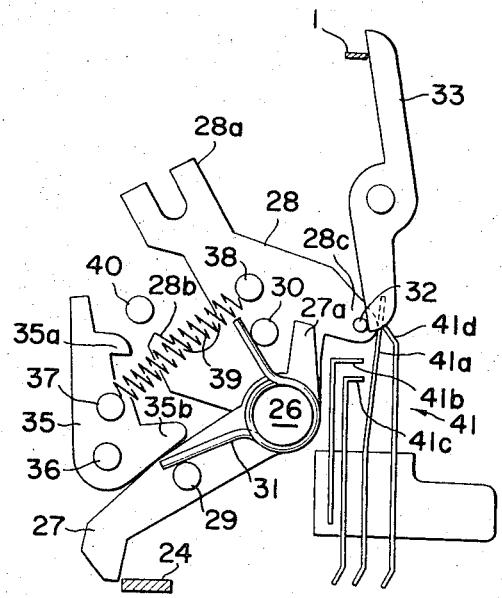

In operation, the respective elements are first placed in the shutter winding state (FIGS. 1, 2 and 3), for example, by the operation of a film winding lever (not shown), and then the shutter release member 21 is depressed. The lever 22 is then rocked or moved in a counterclockwise direction, as viewed in FIG. 2, and its end is disengaged from pin 23. Consequently, the second sliding plate 6 is moved to the left, as shown in FIG. 4, by the action of spring 16. In this case, the electromagnet 43 is held energized as stated above and hence the armature is held immovably. By the leftward movement of the second sliding plate 6, the lever 4 is rotated to set the automatic diaphragm control means at a predetermined aperture value. At the same time, lever 24 is rotated to cause lever 27 to rotate in a clockwise direction, as viewed in FIG. 3. In the initial stage of rotation of the lever 27, the end 28b of the lever 28 is held in engagement with the hook 35a of the lever 35, so that lever 28 does not rotate and spring 31 only is distorted (FIG. 6). As lever 27 is further rotated, its side edge abuts against the end of lever 35, causing lever 35 to rotate in a counterclockwise direction, so that the end 28b of the lever 28 is released from engagement with the hook 35a (FIG. 7). Consequently, lever 28 is rotated in a clockwise direction about the shaft 26 by the energy accumulated in the spring 31, whereby the mirror 3 is raised and lever 32 is rotated to operate the first curtain operating member 1. Thus, the first curtain of the shutter is operated to open the shutter. The lever 28 concurrently moves the arm 41a of switch 41 to break the electrical connection between contacts 41b, 41c and thereby a timing circuit is energized. The contact 41 is, for instance, the FP contact of a flash operating circuit. Because of such arrangement, the start of operation of the timing circuit is not influenced by the mechanical operation of the automatic diaphragm control means.

Figure 5:
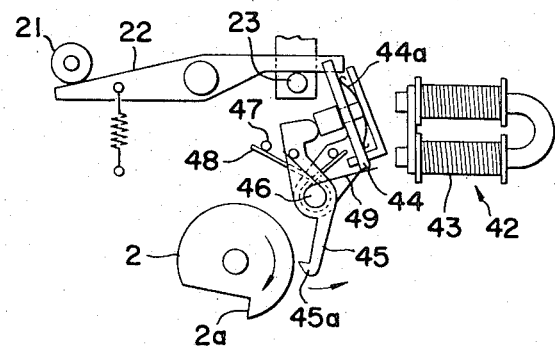

The electromagnet 43 is deenergized upon lapse of a predetermined shutter time after the contacts 41b, 41c are opened. Therefore, armature 44 is set free and the second curtain operating member 2 is rotated, as described above, to operate the second curtain of the shutter (FIG. 5). Thereafter, hook 20, which is interconnected with the member 2 by a suitable mechanism (not shown), is disengaged from the projection 5c of first sliding plate 5 and first sliding plate 5 is returned to the right, together with the second sliding plate 6, by the action of spring 13. In this case, the armature 44 is moved to the right by the pin 23 on second sliding plate 6. The armature 44 is provided therein with a leaf spring 44a to compensate a stroke differential between the armature and second sliding plate 6, which will possibly occur when the armature is moved towards the electromagnet 43 by pin 23.

Although the present invention has been described and illustrated herein in terms of a preferred embodiment thereof, it should be understood that the present invention is not restricted to the details of the arrangement and construction of the embodiment but many changes and modifications are possible without deviating from the concept of the invention.

In the claims:

1. A shutter operating mechanism in a single lens reflex camera comprising a shutter release member, automatic diaphragm control means in operative relationship with said shutter release member and normally held in a full-open position but closed to a predetermined aperture value in response to the operation of said shutter release member, a mirror in operative relationship with said shutter release member and normally held in a position to reflect light from an objective lens towards a finder but which is moved off the light path through said objective lens in response to the operation of said shutter release member, a member in operative relationship with said shutter release member to operate a first curtain of a shutter in response to the operation of said shutter release member and a member operatively associated with said shutter release member to operate a second curtain of the shutter, said shutter operating mechanism including timing circuit means having a trigger switch in mechanical relationship with said mirror to be operated in response to the movement of said mirror and in operative relationship for controlling operation of said second curtain operating member.

2. A shutter operating mechanism as defined in claim 1, further including a single pivot lever in operative relationship with said mirror and with said first curtain operating member to enable said mirror and said first curtain operating member to be concurrently operated by said single pivot lever and wherein the trigger switch of said timing circuit is in operative relationship with said single pivot lever to be operated by said lever.

3. A shutter operating mechanism as defined in claim 2, further including two sliding plates and a spring biasing said plates towards each other, said plates being in operative relationship with said shutter and with said shutter release member such that in winding the shutter the first sliding plate is moved in one direction by a predetermined distance, with the second sliding member being latched, whereas in releasing the shutter said second sliding plate is released and moved in said one direction under the biasing force of said spring, whereby the automatic diaphragm control means is operated to a predetermined aperture value in response to the movement of said second sliding plate and concurrently said lever is moved.

4. A shutter operating mechanism as defined in claim 3, further including a pivotable second lever coaxially positioned with respect to said first lever and a second spring extending between said two levers, said second lever being in operative relationship to be rotated by the movement of said second sliding plate and said first lever being held against rotation in the initial stage of rotation of said second lever but being released when energy has been accumulated in said second spring and rotated by the accumulated energy of said second spring.

5. A shutter operating mechanism as defined in claim 1, further including a spring-biased hook member in operative relationship with said second curtain operating member for latching said second curtain operating member, an electromagnet having an armature, said hook member being positioned to be disengaged from the second curtain operating member by movement of said armature at the end of the shutter time.

* * * * *